United States Patent [19]

Larson

[11] Patent Number: 5,412,795
[45] Date of Patent: May 2, 1995

[54] STATE MACHINE HAVING A VARIABLE TIMING MECHANISM FOR VARYING THE DURATION OF LOGICAL OUTPUT STATES OF THE STATE MACHINE BASED ON VARIATION IN THE CLOCK FREQUENCY

[75] Inventor: Ronald J. Larson, Minneapolis, Minn.

[73] Assignee: Micral, Inc., New Brighton, Minn.

[21] Appl. No.: 840,883

[22] Filed: Feb. 25, 1992

[51] Int. Cl.⁶ ............................................. G06F 15/00
[52] U.S. Cl. .................................... 395/500; 395/275; 395/550; 364/251.3; 364/270.6; 364/926.91; 364/DIG. 1
[58] Field of Search ............... 395/550, 275, 375, 500; 364/238.3, 240.3, 251.3, 251.4, 270.6, 926.91, 270.5; 307/265, 269, 272.2; 375/20; 377/44, 52, 71

[56] References Cited

U.S. PATENT DOCUMENTS

| | | | |
|---|---|---|---|
| 3,974,479 | 8/1976 | Kotok et al. | 395/425 |
| 4,499,536 | 2/1985 | Gemma et al. | 395/425 |
| 4,631,702 | 12/1986 | Korba | 395/550 |
| 4,633,194 | 12/1986 | Kikuchi et al. | 331/25 |
| 4,745,630 | 5/1988 | Underwood | 377/29 |
| 4,754,163 | 5/1988 | Aue et al. | 307/265 |
| 4,809,221 | 2/1989 | Magliocco et al. | 364/900 |
| 4,819,164 | 4/1989 | Branson | 364/200 |
| 4,947,411 | 8/1990 | Shiraishi et al. | 377/47 |
| 4,953,077 | 8/1990 | Alvarez et al. | 395/550 |
| 5,191,653 | 3/1993 | Banks et al. | 395/275 |
| 5,191,657 | 3/1993 | Ludwig et al. | 395/325 |
| 5,210,858 | 5/1993 | Jensen et al. | 395/550 |
| 5,235,698 | 8/1993 | Lan | 395/550 |
| 5,239,639 | 8/1993 | Fischer et al. | 395/550 |
| 5,247,636 | 9/1993 | Minnick et al. | 395/550 |
| 5,263,172 | 11/1993 | Olnowich | 395/550 |
| 5,287,457 | 2/1994 | Arimilli et al. | 395/200 |
| 5,301,278 | 4/1994 | Bowater et al. | 395/275 |

Primary Examiner—Thomas C. Lee
Assistant Examiner—Moustafa M. Meky
Attorney, Agent, or Firm—Westman, Champlin & Kelly

[57] ABSTRACT

A finite state machine has outputs variable between a finite number of logical outputs states. A clock provides a clock signal having clock pulses, with a frequency, to the state machine. A functional circuit determines the logical output states of the state machine based on state inputs to the functional circuit. A variable timer is coupled to the clock and the functional circuit. The variable timer controls the duration of each logical output state to adjust for changes in the clock frequency based on timing parameters provided to the variable timer. The variable timer varies a number of clock pulses corresponding to each logical output state so the duration of each logical output state remains within a predetermined time limit.

28 Claims, 7 Drawing Sheets

STATE MACHINE HAVING A VARIABLE TIMING MECHANISM FOR VARYING THE DURATION OF LOGICAL OUTPUT STATES OF THE STATE MACHINE BASED ON VARIATION IN THE CLOCK FREQUENCY

BACKGROUND OF THE INVENTION

The present invention deals with a state machine. More particularly, the present invention deals with a state machine which provides an interface between first and second bus systems in a computer system.

A computer system typically has a number of components or devices. The components are coupled to one another through busses. A bus, along with the particular component or components supported by the bus, are collectively referred to as a bus environment. Various bus environments in a computer system serve as connection points for the components in the system so that the components can communicate with one another, or so that one component can access or manipulate another component.

However, it is common that different components have different communication systems or protocols. Thus, the different components need different bus environments to support them in communication with other components.

As an example, a typical computer system has a processor device (or several processor devices) and input-/output (I/O) devices. The processor runs on a processor clock. Therefore, the processor bus environment runs on a time system based on the processor clock. A typical processor bus is defined or specified by the manufacturer or designer of the processor device. For example, the output signals from a processor device step through a certain cycle when performing a read operation on I/O devices. The logical state of the output signals, as well as the timing of those logical states are specified by the manufacturer or designer of the processor device. The processor is typically connected to a processor bus and the I/O devices are typically connected to an I/O bus.

However, the I/O devices are not synchronous with the processor clock and the I/O bus therefore runs on a different time system, other than the processor clock. Further, the logical output states provided by the controller to perform a certain operation may be incompatible, both logically and temporally, with the I/O bus specification. Thus, there is a need to facilitate communication between the processor bus environment and the I/O bus environment so that the processor device can manipulate or communicate with the I/O devices. A circuit which facilitates communication between the two bus environments is typically referred to as a bus interface circuit.

In addition, another aspect of computer systems magnifies the communication problem addressed by a bus interface circuit. Processor specifications have historically been a moving target. In other words, processor designers improve both the functional and speed performance features of the processor with each new generation of processor device. Therefore, with each new generation of processor device, it is typical for a processor bus to have new specifications making the new processor incompatible with previous bus interface circuitry.

Specifically, new processors may contain two types of changes over previous processors. The first is a functional change. If the processor is functionally different than the previous processor, the functional definition of the output signals, or control signals, which are provided from the processor during any given cycle (e.g. a read cycle) are different than they were in the previous generation processor. The output signals simply have different logical output states which define a read cycle. It is evident that such a change requires redesign of the bus interface circuitry responsible for providing the communication link between the processor bus environment and I/O bus environment.

The second type of change which may be made to the processor is a change in the timing or the speed at which the processor operates. It is very common for a new generation of processor to operate at higher speeds than the preceding processor. The problem with such a speed or timing change, in the context of the example in which a processor is coupled to I/O devices such as memory devices, is that the bus interface circuitry is typically designed to optimize the performance of the processor in accessing the I/O devices at the particular speed at which the processor runs. To accomplish this, the bus interface-circuitry is typically synchronized with the processor clock. Therefore, when the speed of the processor clock increases or changes, the interface circuitry (if it is even capable of accommodating the faster or slower operation) tracks the processor clock resulting in a corresponding speed or timing change in the output from the bus interface circuitry. Such a change in speed causes the bus interface circuitry to be incompatible with the I/O bus characteristics.

While new generation processors typically change in both speed and function, there are usually no corresponding changes to the I/O bus environment. Unlike the processor bus environment, the I/O bus environment has timing and functional characteristics that do not change (or change quite minimally) over a long period of time. Such a stable I/O bus specification is valuable to the end user of the system because as long as the new generation processors have bus interface circuits which make the new generation processors compatible with the stable I/O bus specification, the end user can upgrade a processor system without incurring the cost of changing all I/O devices. Instead, the end user can use the same I/O devices on a wide a variety of processor systems. Such a feature saves expense because the end user can buy I/O devices in greater quantity, the I/O devices can be used in a wide variety of systems, and the I/O devices will not become incompatible with new processor bus environments.

Given the fact that the I/O bus is typically a static design target in that it does not change over many years, and given the fact that the processor bus does change with each new generation of processor, the bus interface circuitry has to change because it is typically synchronously coupled to the processor bus environment. Any significant functional or timing change in the processor therefore renders previous bus interface circuitry unusable with later generation processors. This is true even though the I/O bus specification remains the same.

The reason the bus interface circuitry is relatively inflexible is due to the traditional design of the bus interface circuitry. It is typically designed as a synchronous state machine which specifically relates to the speed of the processor clock. Thus, when the speed of the synchronous processor clock changes, the logical and timing operation of the bus interface circuitry changes.

One method used in the past in an attempt to solve the problem of providing communication between the relatively fixed specification for the I/O bus environment and an ever changing processor bus environment was adaptation of functional state machine equations to accommodate several speeds of processor clock. However, this task proved to be very complicated. Further, the logical outputs were still specific to the particular clock speeds chosen by the designer. The root of the problem was that in an efficient state machine, no distinction was made between the logical functions which are accomplished and the timing associated with those functions.

In short, simply running the processor clock faster resulted in the outputs provided to the I/O bus from the interface circuitry also being faster. However, the I/O bus control signals are specified with specific timing parameters which are not, in any way, related to the processor clock. By increasing the speed at which the output signals from the bus interface circuitry are provided at the I/O bus, the output signals from the bus interface circuitry move outside the specification of timing parameters for the I/O bus and therefore the interface circuitry becomes incompatible with the I/O bus and needs to be redesigned.

Therefore, there is a need for bus interface circuitry which remains compatible with the I/O bus specifications regardless of the speed at which the processor is operating. Such a mechanism would save both time and money previously spent in redesigning bus interface circuitry to properly interface the I/O bus environment with the rapidly changing processor bus environment.

SUMMARY OF THE INVENTION

In the present invention, a finite state machine has outputs variable between a finite number of logical output states. Clock means provides a clock signal, having clock pulses with a frequency, to the state machine. Functional circuit means determines the logical output states based on state inputs to the functional circuit means. Variable timing means is coupled to the clock means and the functional circuit means. The variable timing means controls the duration of each logical output state to adjust for changes in the clock frequency based on timing parameters provided to the variable timing means. The variable timing means varies the number of clock pulses corresponding to each logical output state so the duration of each logical output state remains within a predetermined time limit associated with each logical output state.

DETAILED DESCRIPTION OF THE PREFERRED EMBODIMENTS

1. Overview

Figure 1:
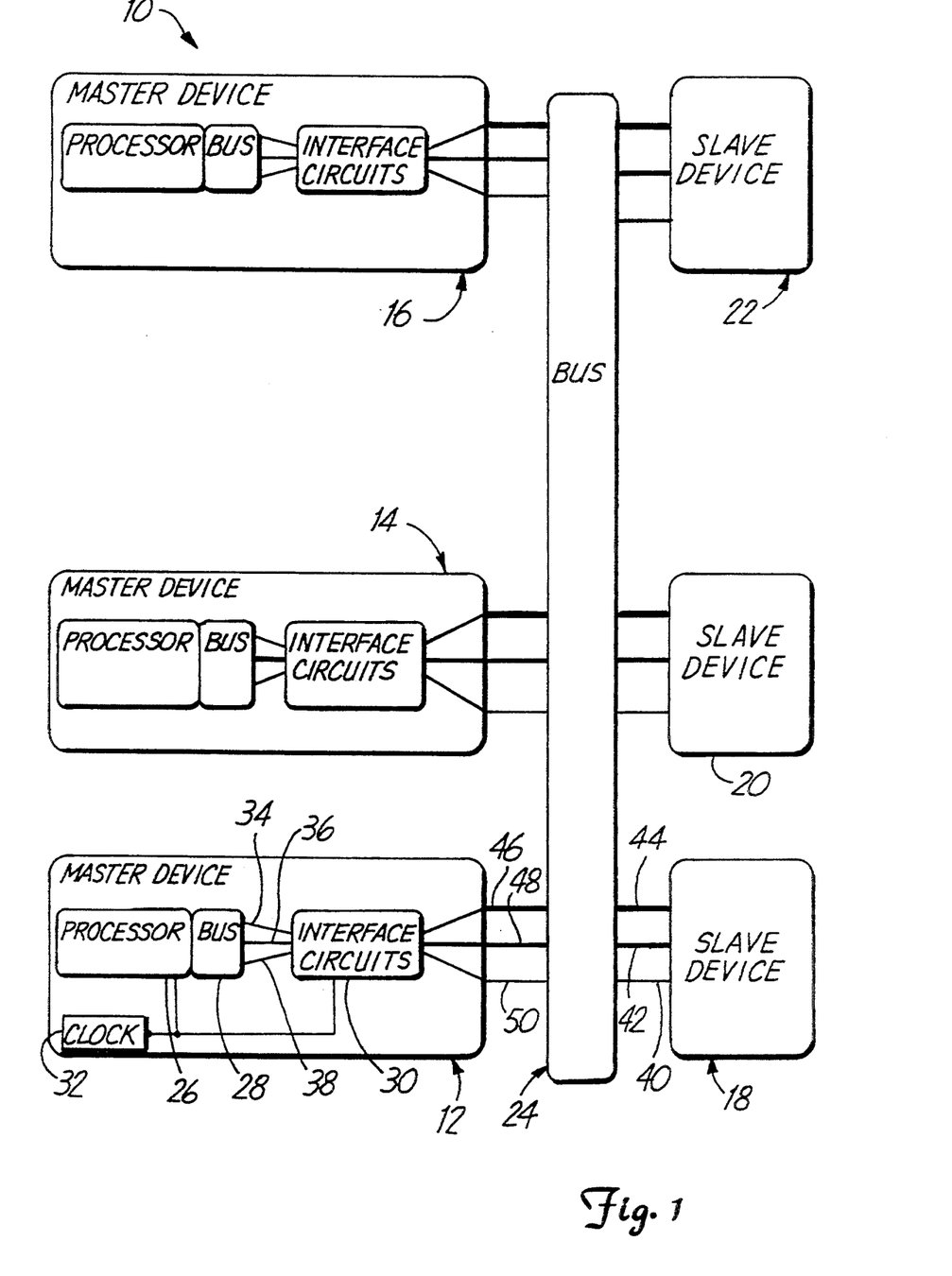
FIG. 1 is block diagram of a computer system.

FIG. 1 shows a typical computer system 10 which includes a number of master devices 12, 14, and 16, associated with a number of slave devices 18, 20, and 22. Master devices 12, 14, and 16, as well as slave devices 18, 20, and 22, are coupled to bus 24. Bus 24 provides means by which the master devices communicate with one another, and with the slave devices.

In the embodiment shown in FIG. 1, each of the master devices 12, 14, and 16 include a processor 26, processor bus 28, interface circuit 30, and clock 32. Processor 26 is typically any type of microprocessor used in a computer system. Processor bus 28 is a bus which is specified for operation with processor 26 and which is used by processor 26 to communicate with other devices or components in computer system 10. Processor 26 and bus 28 are synchronous with one another and are driven by processor clock 32. Processor 26 provides, through processor bus 28, signals such as control signals, address signals, and data signals along signal paths indicated by lines 34, 36, and 38.

In this preferred embodiment, slave devices 18, 20, and 22 contain memory devices which provide storage capacity for the processors in master devices 12, 14, and 16. It should be noted that slave devices 18, 20 and 22 can be any type of slave devices. However, memory devices are commonly used in computer systems such as system 10. Therefore, memory devices, being preferred slave devices, are chosen for illustrative purposes. Thus, the memory devices which comprise slave devices 18, 20, and 22 are accessed and manipulated by master devices 12, 14, and 16. Processor 26 provides signals, through bus 28, to bus interface circuit 30 along signal paths 34, 36, and 38. Bus interface circuit 30, in turn, provides signals to bus 24 along signal paths 46, 48, and 50. Bus 24 provides the signals (which may comprise address, data and control signals) to the memory devices of slave device 18 along signal paths represented by lines 40, 42, and 44. Also, slave device 18 provides return signals (such as data and timing signals) to processor 26 via bus 24, interface circuit 30.

The memory devices in slave device 18 are typically not synchronous with processor 26 or processor bus 28 because the memory devices are not driven by processor clock 32. Therefore, bus 24, which in this embodiment is referred to as an input/output (I/O) bus is not synchronous with processor bus 28.

In fact, I/O bus 24 typically has specifications for timing and functional control which are vastly different than, and therefore incompatible with, signals provided by processor bus 28 along signal paths 34, 36, and 38. The specifications for I/O bus 24 are commonly set out in a written specification provided by the manufacturer or designer of I/O bus 24. Therefore, bus interface circuit 30 is provided to facilitate communication between processor bus 28 and I/O bus 24.

Interface circuit 30 accepts at its input the control, address, and data signals along paths 34, 36, and 38 from processor bus 28. Further, interface circuit 30 accepts at its input a clock signal from clock 32. In response to the instructions received from processor 26, through processor bus 28, interface circuit 30 provides outputs which follow the logical and timing cycle specified for I/O bus 24 in the written specification provided by the manufacturer or designer of I/O bus 24. Interface circuit 30 provides these outputs along signal paths 46, 48, and 50, respectively.

For example, when processor 26 needs to access a certain portion of the memory in slave device 18, processor 26 provides a data request (e.g. signals requesting that a read cycle be performed on the memory devices in slave device 18), through processor bus 28, to bus interface circuit 30. Since processor 26 is driven by processor clock 32, and since I/O bus 24 is not synchronous with clock 32, the data request provided to bus interface circuit 30 is, in all likelihood, incompatible with I/O bus 24. Therefore, bus interface circuit 30 converts the data request from processor bus 28 into a read cycle compatible with bus 24. The read cycle is provided, through bus 24, to the memory devices on slave device 18 to access data from those memory devices.

Bus interface circuit 30 provides the read cycle at its outputs in the form of a plurality of logical output states. The duration of each logical output state on the outputs of bus interface circuit 30 is timed properly so that the read cycle meets the logical and temporal specifications for I/O bus 24. While the function of bus interface circuit 30 has been described with reference to a read cycle, the function of providing communication between processor bus 28 and I/O bus 24 is performed by bus interface circuit 30 for any number of desired operations including write operations.

2. Prior Art Bus Interface Circuits

In the past, interface circuits such as bus interface circuit 30 were designed in the form of a state machine to convert processor requests into output cycles based on a clock signal having a given frequency. A variety of prior art state machines are described in some detail in *An Engineering Approach To Digital Design*, pp. 290–295, by William I. Fletcher published M80 by Prentice-Hall, Inc. of Englewood Cliffs, N.J. 07632. Those pages are hereby incorporated by reference.

Figure 2:
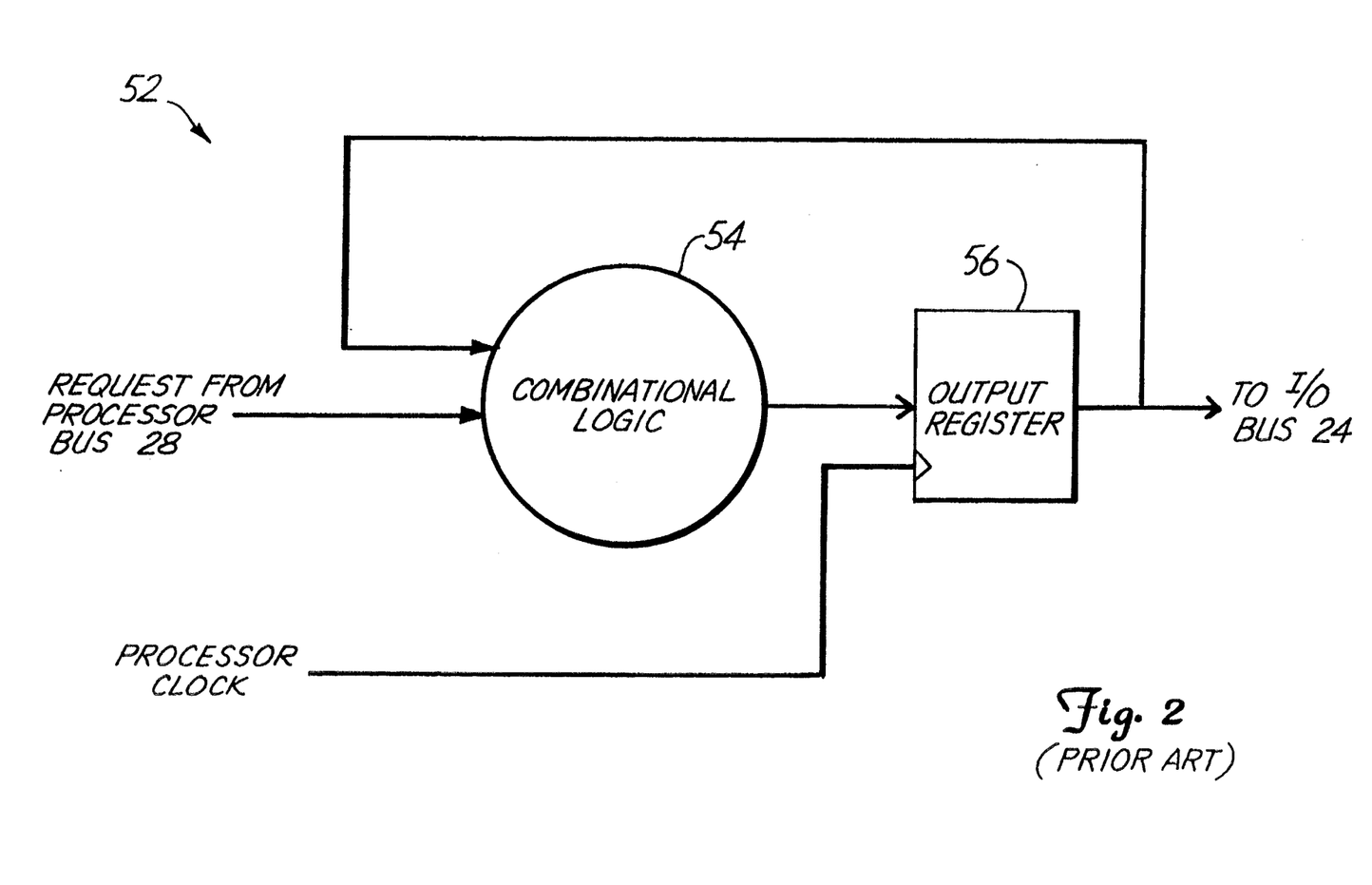
FIG. 2 is a block diagram of a typical state machine.

FIG. 2 shows one example of a prior art bus interface circuit 52. The state machine of prior art bus interface circuits included combinational logic 54 and output register 56. The processor request would be provided to combinational logic 54. Based on the processor request, combinational logic 54 would provide a logical output to output register 56. Output register 56 would, in turn, be clocked by processor clock 24 and the outputs from combinational logic 54 would be provided through output register 56 as the logical outputs to I/O bus 24. The logical outputs would also be fed back to combinational logic 54 to determine the next logical output state to be provided to I/O bus 24. On the next processor clock pulse, the new logical output state would be clocked through output register 56 to I/O bus 24.

By using bus interface circuit 52, the logical output states provided to I/O bus 24 were directly tied to the processor clock frequency of processor 32. While combinational logic 54 can be designed to accommodate the frequency of processor clock 32, if that frequency changed, combinational logic 54 would need to be redesigned to accommodate the new processor clock frequency. This concept can be further illustrated using timing diagrams.

Figure 2A:
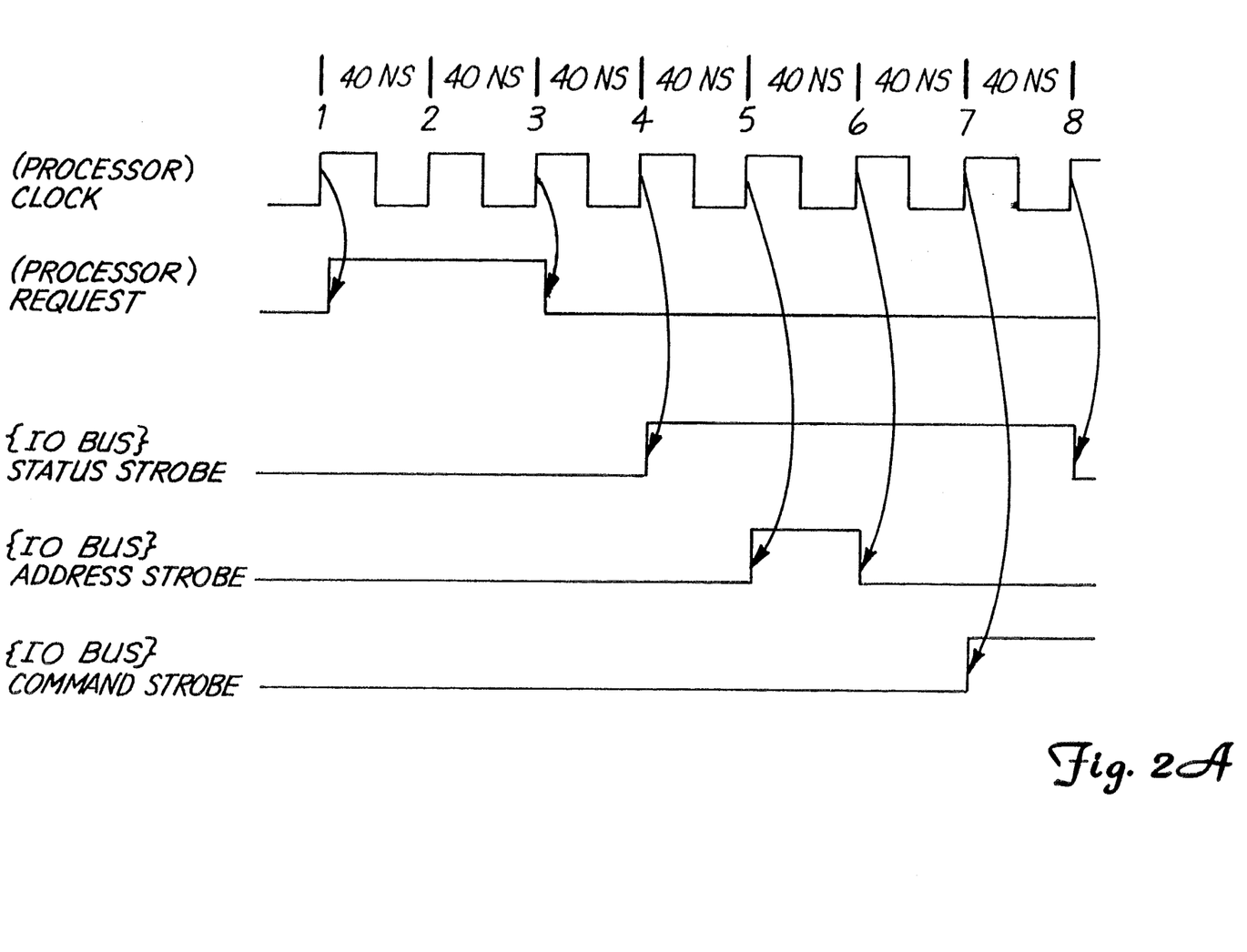
FIG. 2A is a timing diagram associated with a typical bus interface circuit.
Figure 3:
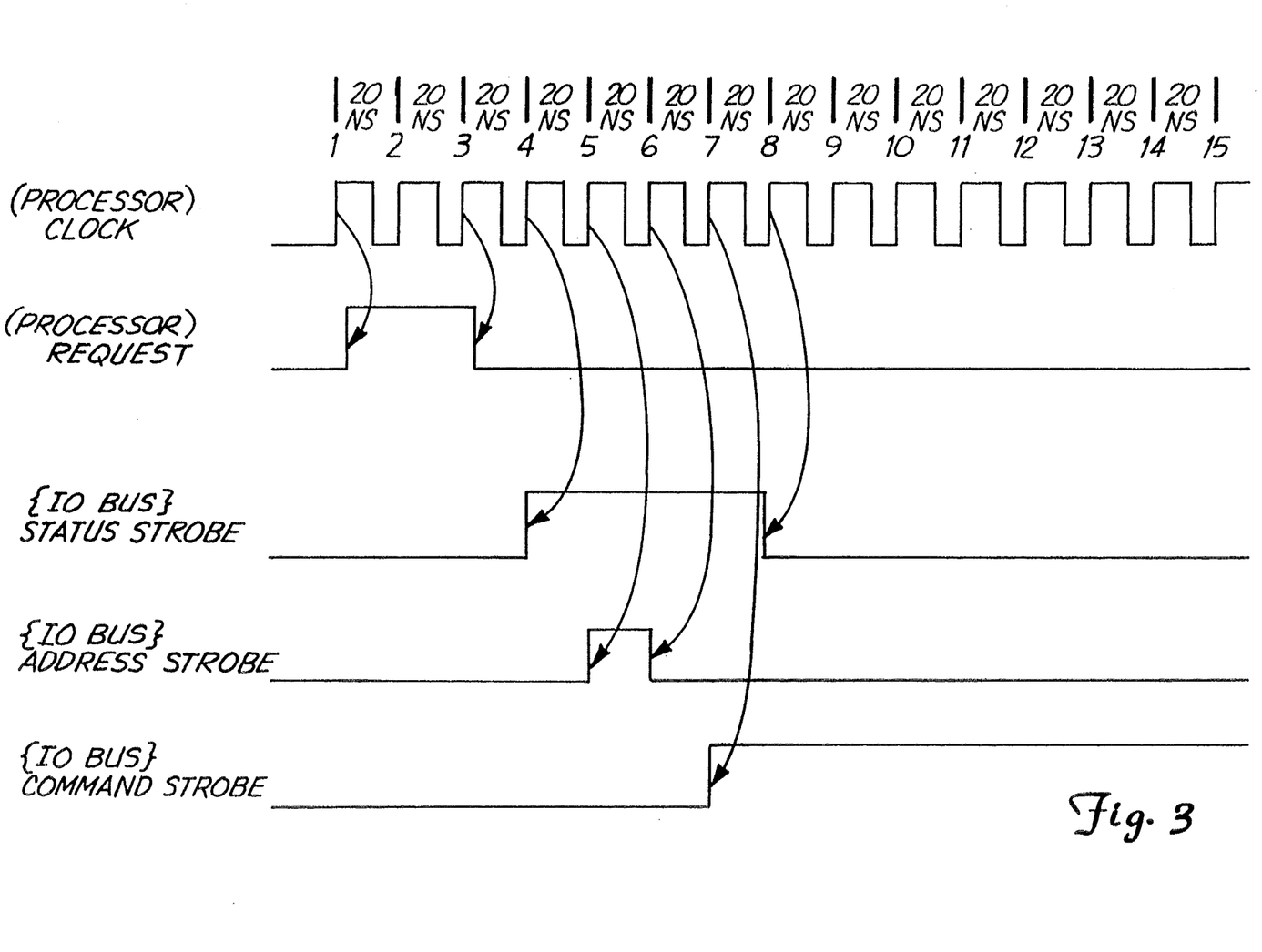
FIG. 3 is a timing diagram associated with a bus interface circuit having a 20 ns processor clock.

FIG. 2A is a timing diagram associated with bus interface circuit 52 shown in FIG. 2. The clock period of the processor clock is 40 ns. FIG. 3 is a timing diagram associated with bus interface circuit 52 where the clock period is 20 ns. In FIG. 2A a processor request is initiated by processor 26. The processor request is generically indicated by a Request signal which lasts for two clock pulses. The Request signal is asserted high and begins with the rising edge of the first clock pulse and ends with the rising edge of the third clock pulse. A typical processor request may involve more than one signal. However, for the sake of clarity, the processor request shown in FIG. 2A is represented by a single signal.

In response to the processor Request signal, bus interface circuit 52 provides three output signals. Those signals include a Status Strobe signal, an Address Strobe signal, and a Command Strobe signal. The required logical state of the three outputs in order to perform a read cycle is specified by the specification for I/O bus 24. The specification ensures that the three signals reach the memory devices in slave device 18 in the proper state and with proper timing in order the achieve the desired request from processor 26. Thus, combinational logic 54 is designed to provide the three outputs as shown in FIG. 2A. The Status Strobe goes high (becomes asserted) with the rising edge of the fourth clock pulse. The Address Strobe signal goes high with the rising edge of the fifth clock pulse and goes low (becomes de-asserted) with the rising edge of the sixth clock pulse. The Command Strobe signal goes high with the rising edge of the seventh clock pulse. Finally, the Status Strobe returns to a logic low level with the rising edge of the eighth clock pulse.

Typically, a specification which defines I/O bus 24 provides that the Status Strobe, Address Strobe, and Command Strobe signals must be provided in the appropriate logical states within a minimum or maximum time period. The time period is entirely unrelated to the period of the processor clock signal. For example, a typical specification defining I/O bus 24 would state that the Address Strobe signal can only become asserted (go to a logic high level) at least 40 ns after the Status Strobe becomes asserted. Then, the Address Strobe must become de-asserted at least 80 ns before the Status Strobe becomes de-asserted. In addition, the specification defining I/O bus 24 would typically state that the Command Strobe must become asserted at least 40 ns prior to the time that the Status Strobe becomes de-asserted. Based on such specifications, combinational logic 54 is designed so that when processor 26 requests such a cycle, the output signals from the bus interface circuitry 52 are provided at the appropriate logic levels and at the appropriate times given the period of the processor clock signal.

However, if a new generation of processor chip is manufactured, and the new chip runs twice as fast as the old processor chip (i.e., the processor clock has a period of 20 ns), the new chip would not work with the old bus interface circuit 52. The result of using the new processor with the old bus interface circuit 52 is illustrated by the timing diagram shown in FIG. 3. In essence, since combinational logic 54 is designed for a given processor clock period, all of the output signals move through the desired cycle twice as fast since the processor clock is twice as fast.

In other words, the Status Strobe signal still becomes asserted with the rising edge of the fourth clock pulse and de-asserted with the rising edge of the eighth clock pulse. In addition, the Address Strobe signal still becomes asserted with the rising edge of the fifth clock pulse and becomes de-asserted with rising edge of the sixth clock pulse. Finally, the Command Strobe still becomes asserted with the rising edge of the seventh clock pulse. Even though the three signals are still controlled by the same clock pulse, they violate the specification for I/O bus 24. The Address Strobe, for example, becomes asserted 20 ns after the Status Strobe signal became asserted. This violates the minimum time separation between the two signals specified as 40 ns. The same is true for the other timing specifications which define I/O bus 24. Therefore, prior art bus interface circuit 52 no longer works with the new generation processor and the bus interface circuit must be redesigned.

3. The Present Bus Interface Circuit a. The Output Cycle

The present invention overcomes the problems associated with changing processor specifications and relatively static I/O bus specifications. The present invention recognizes that the functional or logical output state of the signals from bus interface circuit 30 are separable from the timing aspects of the logical output states.

Depending upon the type of access which processor 26 is trying to gain to the slave devices, or depending on the type of manipulation which processor 26 is attempting, the outputs of bus interface circuit 30 must cycle through a plurality of logical states. Each logical state must exist for a duration of time specified by the specification for I/O bus 24. Such a sequential cycle of outputs from bus interface circuit 30 can be referred to generically as an output cycle, and may specifically be a read operation (or read cycle) or a write operation or any type of communicative cycle.

Figure 4:
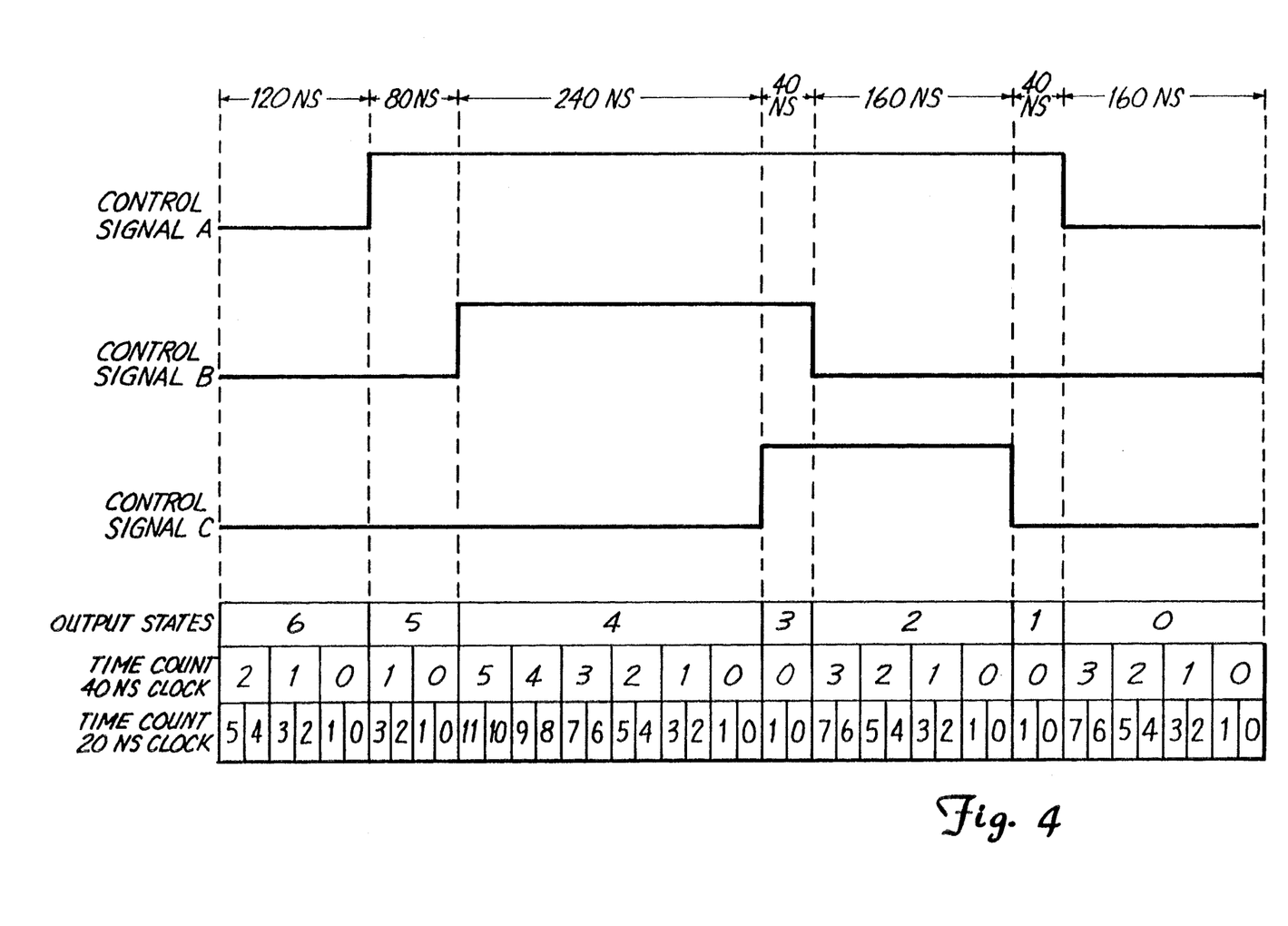
FIG. 4 is a timing diagram associated with a bus interface circuit of the present invention.

Each specific cycle can be broken into a finite number of states in which the output signals must exist. For example, FIG. 4 is a timing diagram showing three signals which are designated, for the sake of simplicity, as control signal A, control signal B, and control signal C. If, for example, during a read cycle, control signals A, B, and C must go through the output cycle shown in FIG. 4 in order to accomplish the desired task, then such a cycle can be broken into seven logical output states. The seven logical output states are indicated in FIG. 4 as output states 0–6.

In state 6, all of control signals A, B, and C are in a de-asserted (i.e., logic low) position. In state 5, control signal A becomes asserted and control signals B and C are still de-asserted. In state 4, control signals A and B are asserted but control signal C remains de-asserted. In state 3, all three control signals A, B, and C are asserted. In state 2, control signals A and C are asserted while control signal B is de-asserted. In state 1, control signal A is asserted and control signals B and C are de-asserted. Finally, in state 0, all three signals return to the de-asserted position.

While the control signals shown in FIG. 4 are labeled A, B, and C, and while the specific communicative duty which they perform is not specified, it will be understood that such signals could be any signals required by I/O bus 24 to accomplish any manipulative or communicative task. For the sake of simplicity, the cycle shown in FIG. 4 will simply be referred to as an output cycle. Any desired cycle can be similarly broken down into a plurality of states in the same manner.

b. Functional Block Diagram of Bus Interface Circuit 30

The present invention recognizes that, not only can an output cycle be broken down into a finite number of logical output states, each state has a required duration. The duration is specified by the specification for I/O bus 24.

The present invention separates bus interface circuit 30 into one portion which determines the desired logical output states for the output cycle requested by processor 26, and a second portion which assigns a number of clock pulses to each logical output state to achieve the desired duration for each state, and to thereby achieve proper timing for I/O bus 24. This is indicated more clearly in FIG. 5.

Figure 5:
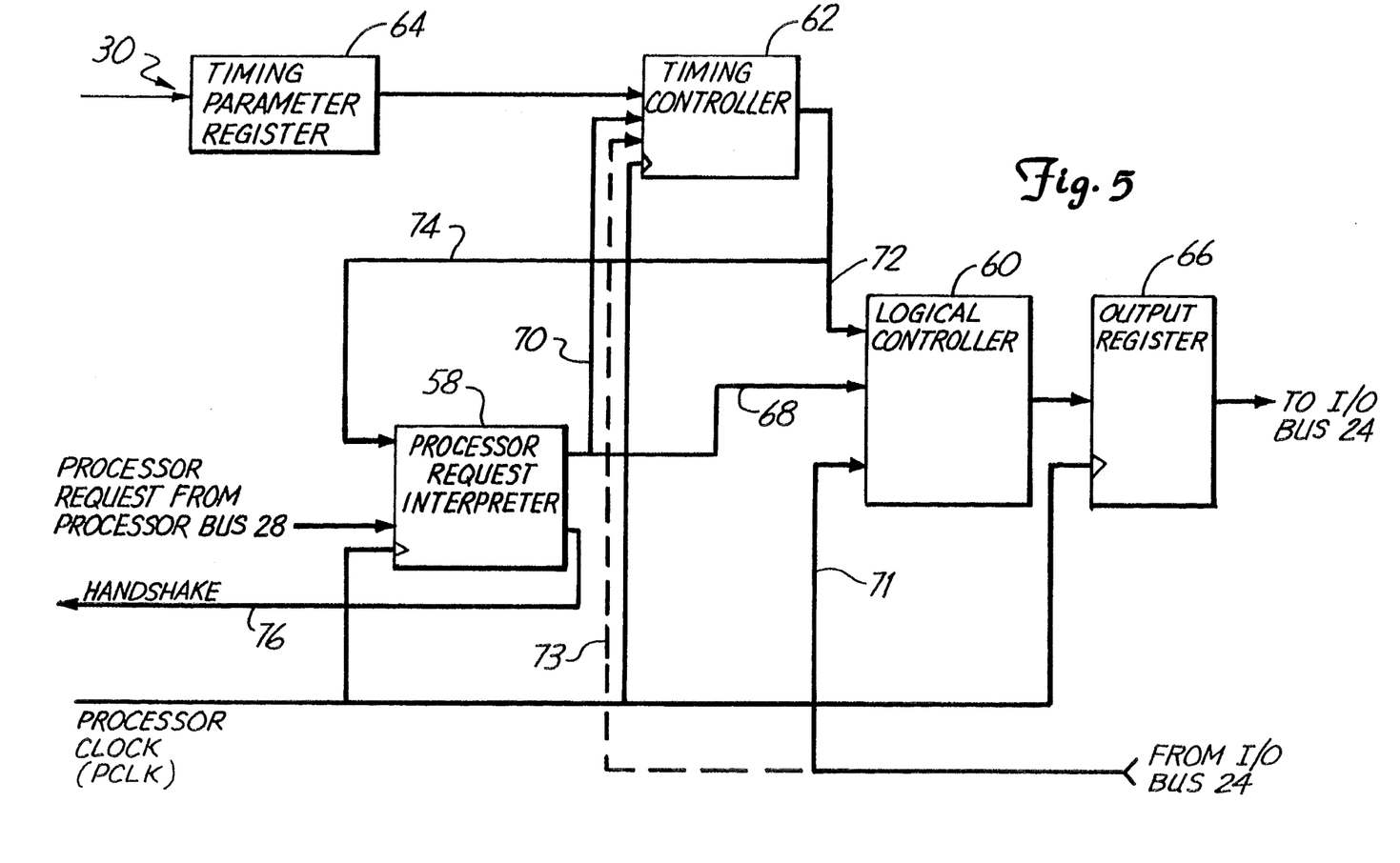
FIG. 5 is a block diagram of a bus interface circuit of the present invention.

FIG. 5 shows a more detailed block diagram of bus interface circuit 30 shown in FIG. 1. Bus interface circuit 30 of the present invention includes processor request interpreter 58, logical controller 60, timing controller 62, timing parameter register 64, and output register 66.

In operation, bus interface circuit 30 is initialized prior to undertaking any requests from processor 26. During initialization, timing parameter register 64 is provided with timing data which is indicative of the period of the processor clock 32 being used with the specific type of processor 26 installed in master device 12.

After initialization, and when processor 26 desires to perform some operation requiring communication with, for example, slave device 18, processor 26 provides a processor request signal to processor request interpreter 58 through processor bus 28. Based on the request received from processor 26, processor request interpreter 58 provides a cycle input signal to logical controller 60 and timing controller 62. This is indicated by arrows 68 and 70. The cycle input signal indicates to logical controller 60 and timing controller 62 the desired output cycle which bus interface circuit 30 is to provide to I/O bus 24. Based on the cycle input signal, logical controller 60 determines which logical output states are required at the output of bus interface circuit 30. Timing controller 62 determines the duration that each logical output state in the desired output cycle must have in order to meet the specification for I/O bus 24.

Based on the timing parameter signals received from timing parameter register 64, and based on the specific output cycle being executed by bus interface circuit 30, timing controller 62 provides control signals to logical controller 60. This is indicated by arrow 72. The control signals provided by timing controller 62 control logical controller 60 so that logical controller 60 only provides the next logical output state of the output cycle to output register 66 after the current logical output state has been in place for a desired minimum duration. In essence, based on the particular output cycle being executed, and based on the timing data received from timing parameter register 64, timing controller 62 provides control signals (indicated by arrow 72) to logical controller 60 which cause an adequate number of pulses of the processor clock 32 to be assigned to each logical output state from logical controller 60 so that the output cycle provided to I/O bus 24 meets the specification requirements of I/O bus 24.

The signals provided by timing controller 62 are hereinafter referred to as intermediate state signals. The intermediate state signals are also provided to processor request interpreter 58. This is indicated by arrow 74. Based on the intermediate state signals received from timing controller 62, processor request interpreter 58 indicates to processor 26, through processor bus 28, when the desired output cycle has been completed. Processor request interpreter 58 then awaits another processor request from processor 26. This "handshaking" is indicated by arrow 76.

Output register 66 is also provided. Output register 66 synchronizes the output of logical controller 60 in order to avoid glitches or spurious signal anomalies being provided to I/O bus 24.

In addition, bus interface circuit 30 also receives return signals from I/O bus 24. This is indicated by arrow 71 and dashed arrow 73. The return signals typically include information representative of a condition of slave device 18. The return signals are provided to logical controller 60 to modify subsequent functional behavior of bus interface circuit 30 to achieve appropriate handshaking with I/O bus 24 and slave device 18. The return signals may also be provided to timing controller 62 to modify subsequent timing behavior of bus interface circuit 30.

c. Timing Controller 62

Figure 6:
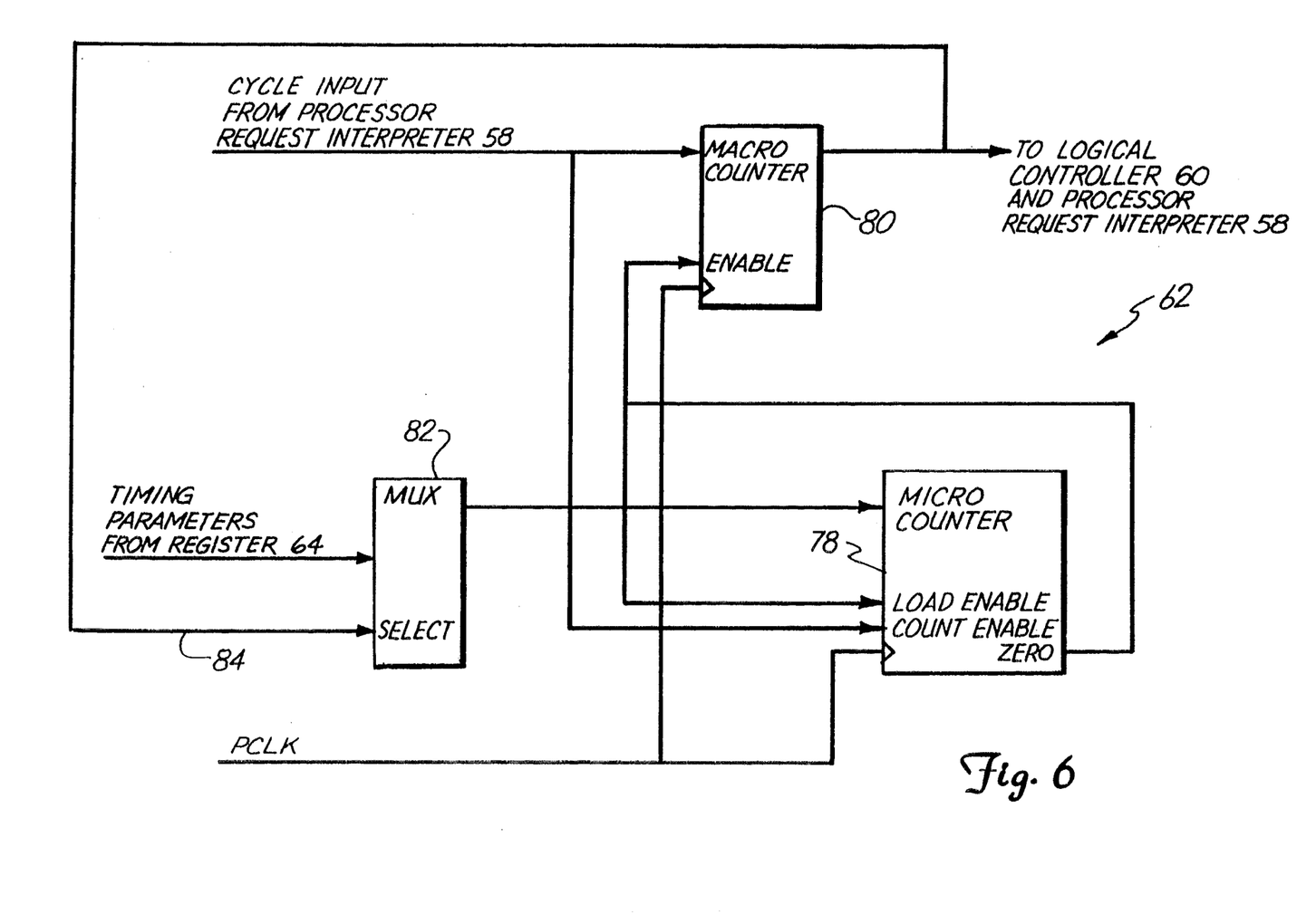
FIG. 6 is a block diagram of the timing controller shown in FIG. 5.

FIG. 6 shows a more detailed block diagram of one embodiment of timing controller 62. Timing controller 62 includes microcounter 78, macrocounter 80, and multiplexor 82. Macrocounter 80 has, as its input, the cycle input signal from processor request interpreter 58. The output of macrocounter 80 provides the intermediate state signals to logical controller 60 and to processor request interpreter 58. The intermediate state signals are also provided to the select input of multiplexor 82. This is indicated by arrow 84. Multiplexor 82 has, at its input, the timing parameters from timing parameter register 64 shown in FIG. 5. Multiplexor 82 provides, at its output, the inputs selected by the intermediate state signals provided by macrocounter 80. The output of multiplexor 82 is provided to the input of microcounter 78. The count enable input of microcounter 78 is coupled to the output of processor request interpreter 58. Microcounter 78 also has a zero output which indicates when it has reached a zero count. The zero output of microcounter 78 is provided to the count enable input of macrocounter 80 and is also fed back to the load enable input of microcounter 78.

In operation, macrocounter 80 is initially loaded, based on the cycle input from processor request interpreter 58, with a number which represents the total number of logical output states that exist in the requested cycle. For instance, with the output cycle shown by the timing diagram in FIG. 4, there are a total of seven logical output states. Thus, if processor 26 requests an operation requiring the output cycle shown in FIG. 4, macrocounter 80 is loaded to the number 6.

Based on the total number of states loaded into macrocounter 80, multiplexor 82 selects from a number of timing parameters provided by timing parameter register 64. Those timing parameters represent the total number of clock pulses of the processor clock (PCLK) which must be assigned to logical output state number 6 in the output cycle in order for that state to obtain its minimum duration. Since microcounter 78 initially contains the number zero, its zero output enables it to be loaded with the information provided at the input of microcounter 78. The number of clock pulses which must be assigned to state 6 is consequently loaded into microcounter 78.

Referring, for example, to FIGS. 4 and 6, if the processor clock has a 40 ns period, macrocounter 80 is first loaded to the number 6 since there are a total of 7 states in the requested output cycle. The output of macrocounter 80 is provided to the select input of multiplexor 82. Since the timing parameters in timing parameter register 64 are provided based on the period of the processor clock, the output of macrocounter 80 selects the number 2 from the timing parameter inputs to multiplexor 82 because in order to meet the timing specifications shown in FIG. 4, three 40 ns clock pulses must be assigned to state 6 of the desired o-·put cycle. Thus, microcounter 78 is loaded to the number 2.

The output of macrocounter 80 is provided, in turn, to logical controller 60. Based on the output of macrocounter 80, logical controller 60 provides, at its output, three logical low signals on control signal lines A, B, and C. The output from processor request interpreter 58 provides an enable signal to the count enable input of microcounter 78. Thus, with the next clock pulse, microcounter 78 begins to count down with each count of PCLK. When microcounter 78 counts from 2 to 0 (after 120 ns) the zero output of microcounter 78 enables macrocounter 80 to count down. With the next clock pulse on PCLK, macrocounter 80 counts from 6 to 5.

With the new output of macrocounter 80 being 5, logical controller 60 provides a new logical output state where control signal A is asserted (in a logical high position) and control signals B and C are de-asserted. Also, the outputs of macrocounter 80 select a new set of timing parameters from timing parameter register 64 at multiplexor 82. Since the zero output from microcounter 78 now enables microcounter 78 to be loaded, the new timing parameters are loaded into microcounter 78. The new timing parameters are the number 1, since two 40 ns clock pulses must be assigned to state 5, and microcounter 78 is loaded to the number 1. As microcounter 78 counts from 1 to 0 with each count of PCLK (after 80 ns) the zero output of microcounter 78 again enables macrocounter 80 to decrement by one count. Thus, the new output of macrocounter 80 decrements to 4.

The new output is provided to logical controller 60 which provides a new logical output state (control signals A and B high and control signal C low) to output register 66. The output of macrocounter 80 also selects new timing parameters from timing parameter register 64 through multiplexor 82. The new timing parameters correspond to the fourth state in the desired output cycle and are therefore the number 5. Thus, the number 5 is loaded into microcounter 78. Microcounter 78 then begins to count down with each count of PCLK. After microcounter 78 reaches 0 (after 240 ns) the zero output of microcounter 78 again enables macrocounter 80 to decrement by 1 count.

This process continues throughout the entire seven states in the output cycle until the entire output cycle is completed. Once the output cycle is completed, the intermediate state signals provided by macrocounter 80 to processor request interpreter 58 cause processor request interpreter 58 to initiate a handshake signal 76 with processor 26 through processor bus 28. This indicates to processor 26 that the desired output cycle has been completed and that a new request can be initiated.

Bus interface circuit 30 operates identically no matter what the period of the processor clock 32. The only things which change are the timing parameters loaded into timing parameter register 64 upon initialization of the system.

For example, FIG. 4 also shows the necessary timing parameters if the processor clock has a 20 ns period. To accomplish the identical output cycle as that accomplished with a processor having a clock with a 40 ns period, the timing parameters simply need to be doubled. Thus, rather than requiring microcounter 78 to count three clock pulses in logical output state 6, microcounter 78 must count 6 clock pulses before allowing logical controller 60 to change states. Further, microcounter 78 must count 4 clock pulses rather than 2 while the outputs are in logical output state 5. Rather than counting 6 clock pulses in state 4, microcounter 78 must count 12 pulses, and so on. Thus, timing parameter register 64 must simply be loaded with the proper values based on the speed of clock 32.

It should be noted that the examples given in the present specification are primarily illustrative. Thus, while FIG. 6 shows two interleaved counters (microcounter 78 and macrocounter 80) and one multiplexor (multiplexor 82) it may be necessary in some implementations, with a large number of output cycles, to have a larger number of nested counters. In addition, several multiplexors may be needed to implement any specific application. Also, while the embodiment of timing controller 62, shown in FIG. 6, includes counters and a multiplexor, timing controller 62 could be implemented using a variety of other means including programmable array logic.

Logical controller 60, in the preferred embodiment, is a memory device wherein the cycle input signal provides a portion of the address to the memory device and the intermediate state signals from timing controller 62 provide the remainder of the address signals. Logical controller 60 can be a read only type memory (ROM) or it can be a random access type memory (RAM). The advantages of having a RAM device are that the functional equations provided by logical controller 60 can then be rewritten upon each initialization of the system. This essentially provides a universal type system where not only the timing parameters can be changed whenever desired, but the functional equations provided at the output of the bus interface circuitry can also be changed as desired. Such a system is highly flexible and can be adapted to accommodate not only changes in processor speed and function, but also changes in the speed and function of the I/O bus.

4. Conclusion

The present invention substantially overcomes the problems associated with communication between a processor bus environment, which changes both functionally and temporally quite often, and an I/O bus environment, which is typically defined by a non-changing specification. The present invention separates the logical and temporal functions of the bus interface circuit so that timing can be changed to accommodate substantially any clock frequency. All that needs to be done is program the appropriate timing parameters into a register upon initialization of the system. The present invention also provides a system which can be programmed, with each initialization, to accommodate changes in logical function. Logical controller 60 can be a dynamic device which is programmable with different functional equations upon each initialization system. Thus, the present invention provides a highly flexible and universal-type system which essentially eliminates the time and cost associated with redesigning bus interface circuitry each time changes are made to either the processor bus environment, or the slave bus environment.

Although the present invention has been described with reference to preferred embodiments, workers skilled in the art will recognize that changes may be made in form and detail without departing from the spirit and scope of the invention.

What is claimed is:

1. A computer system, comprising:
   a first bus system;
   a second bus system; and
   interface means for connecting the first bus system to the second bus, the interface means including
   logical interpreter means for receiving input signals from the first bus system representative of a desired operation and for providing output signals to the second bus system in a series of logical states based on the signals received from the first bus system, the series of logical states required to accomplish the desired operation comprising an output cycle; and
   time controller means, coupled to the logical interpreter means, for receiving a clock signal having clock pulses and a frequency from the first bus system, and for adjusting timing in the logical interpreter means based on variation in the clock frequency so the duration of each of the logical states in the output cycle corresponds to a number of clock pulses so that the output cycle is within predetermined time limits, the time controller means including a counter coupled to the logical interpreter means and providing timed inputs to the logical interpreter means, the timed inputs controlling the duration of each of the logical states.

2. The computer system of claim 1 wherein the first bus system comprises:
   a processor bus system, the clock signal being a processor clock.

3. The computer system of claim 1 wherein the second bus system comprises:
   an input/output (I/O) bus system.

4. The computer system of claim 1 wherein the logical interpreter means comprises:
   memory means, for storing logical states corresponding to a plurality of output cycles.

5. The computer system of claim 4 wherein the
   counter is coupled to the memory means and the timed inputs comprise timed address inputs to the memory means, the timed address inputs determining the duration of each logical state in the output cycle.

6. The computer system of claim 5 wherein the counter means comprises:
   a plurality of nested counters, the timed address inputs to the memory means being provided from a first counter in the plurality of nested counters, the plurality of nested counters being configured to provide each timed address input for a desired number of clock pulses, the desired number of clock pulses depending on the frequency of the clock signal.

7. The computer system of claim 6 wherein the time controller means comprises:
   programmable timing parameter storage means, coupled to the counter means, for providing timing parameters indicative of the frequency of the clock signal, the timing parameters determining the desired number of clock pulses assigned to each timed address input provided by the counter means.

8. An apparatus for providing an interface between first and second bus systems in a computer system, the apparatus comprising:

logical interpreter means for receiving a cycle input signal from the first bus system and state input signals, for determining a desired output cycle based on the cycle input signal, and for providing output signals to the second bus system, the output signals cycling through logical output states corresponding to the desired output cycle, the output signals remaining in each logical output state for a state time period the state time period being based on the state input signals; and state timing means, coupled to the logical interpreter means, for receiving a clock signal, having a period, from the first bus system, for receiving timing parameter signals from timing parameter provision means coupled to the state timing means, and for providing the state input signals to the logical interpreter means based on the clock signal and the timing parameter signals, the state timing means providing the state input signals so that the state time period for each logical output state in the output cycle is within predetermined time limits regardless of the period of the clock signal the state timing means including a timer coupled to the interpreter means and controlling the logical interpreter means to maintain the output signals in each logical output state until the state time period has elapsed, the timer being variable to vary the state time period based on the logical output state and the desired cycle.

9. The apparatus of claim 8 wherein the state timing means comprises:

means for causing the state time period corresponding to each logical output state to have a duration corresponding to a number of pulses of the clock signal, based on the timing parameter signals, so the state time period is within the predetermined time limit associated with the state time period.

10. The apparatus of claim 8 wherein the logical interpreter means comprises:

memory means, coupled to the state timing means, for storing state information representative of the logical output states corresponding to a plurality of output cycles, the cycle input signal identifying a portion of the memory means containing the state information associated with the desired output cycle.

11. The apparatus of claim 10 wherein the state timing means comprises:

a first counter, having an input and an output, receiving at the input a state count representative of the number of logical output states contained in the desired output cycle and providing at the output an output count which sequentially counts through the number of logical output states contained in the desired output cycle, the counting means providing the output count as the state input signals to the memory means, the output count accessing portions of the memory means, within the portion identified by the cycle input signal, containing the state information corresponding to the logical output states in the desired cycle.

12. The apparatus of claim 11 wherein the memory means causes the output signals to change to the next sequential logical output state in the desired cycle each time the first counter changes count.

13. The apparatus of claim 12 wherein the
    timer is coupled to the first counter, for controlling the first counter to count only after the state time period has elapsed.

14. The apparatus of claim 13 wherein the timer comprises:

a second counter, coupled to the clock signal and the first counter, controlling the first counter so that the first counter changes the output count only after the second counter counts a number of clock pulses.

15. The apparatus of claim 14 wherein the number of clock pulses counted by the second counter is based on the logical output state corresponding to the output count of the first counter, the desired cycle, and the timing parameter signals.

16. The apparatus of claim 15 wherein the state timing means comprises:

a timing parameter register, coupled to the second counter, for provided timing parameters indicative of the number of clock pulses counted by the second counter, the particular timing parameters provided to the second counter from the timing parameter register being selected based on the output count of the first counter and the desired output cycle.

17. The apparatus of claim 16 and further comprising:

request interpreter means, for receiving a request signal from the first bus and for providing the cycle input signal to the logical interpreter means based on the request signal received.

18. A finite state machine system having logically variable outputs which vary among a finite number of logical output states, comprising:

clock means for providing a clock signal, having clock pulses with a frequency, to the state machine;

functional circuit means for determining the logical output states based on state inputs to the functional circuit means from state input provision means coupled to the functional circuit means and for providing the logically variable outputs; and variable timing means, coupled to the clock means and the functional circuit means, for controlling the duration of each logical output state to adjust for changes in the clock frequency, based on variable timing parameters provided to the variable timing means by timing provision means coupled to the variable timing means, the variable timing means including a counting device providing timed outputs to the functional circuit means to vary a number of clock pulses corresponding to each logical output state so the duration of each logical output state remains within a predetermined time limit associated with each logical output state.

19. The finite state machine system of claim 18 wherein the variable timing means comprises:

a programmable timing register providing the timing parameters to the variable timing means, the timing parameters being based on the clock frequency.

20. The finite state machine system of claim 19 wherein the counting device comprises:

a plurality of counters, at least one of the plurality of counters having outputs provided to the functional circuit means as the state inputs, wherein the duration of each logical output state is based on the duration of the state inputs, the plurality of counters configured to provide the state inputs for a duration corresponding to a number of clock pulses, the number of clock pulses based on the timing parameters provided by the timing register.

21. The finite state machine system of claim 20 wherein the functional circuit comprises:
memory means for storing a plurality of logical output states, the memory means being addressed by the state inputs provided from the plurality of counters in the variable timing means.

22. An interface circuit for providing an interface between a processor and a slave device, the processor being coupled to a processor bus running on a processor clock having a period and the slave device being coupled to a slave bus running on a time system other than the processor clock, the interface circuit being coupled between the processor bus and the slave bus and receiving requests from the processor through the processor bus to manipulate the slave device, the interface circuit translating the requests into output signals provided to the slave bus, the output signals changing through a plurality of logical output states to manipulate the slave device, each logical output state being timed to be compatible with the time system of the slave bus, the interface circuit comprising:
a processor request interpreter, coupled to the processor bus, for receiving a request and providing request information representative of the request;
a logical controller, coupled to the processor request interpreter, for receiving the request information and providing the output signals in the logical output states to the slave bus based on the request information;
programmable time storage means, coupled to the processor bus, for receiving and storing time data corresponding to the period of the processor clock; and
a timing controller coupled to the time storage means, the processor request interpreter and the logical controller, the timing controller including a counter providing outputs to the logical controller controlling the timing of the logical output states based on variation in clock frequency indicated by the time data and the request information so the logical output states correspond to a number of clock pulses such that the logical output states are operable with the predetermined time system of the slave bus.

23. The interface circuit of claim 22 wherein the counter assigns a number of pulses of the processor clock to each of the logical output states, the number of pulses assigned being based on the particular logical output state, the time data and the request information.

24. The interface circuit of claim 23 wherein the logical controller comprises:
memory means storing the logical output states, the timing controller providing timed control signals to the memory means so that the memory means provides the output signals in the logical output states for a desired time.

25. A method of converting request signals from a processor running on a processor clock having a first frequency to output signals having a plurality of logical output states timed for manipulating a slave device running on a time system other than the processor clock, the method comprising:
receiving the request signals from the processor;
determining the logical output states based on the request signals;
receiving variable timing parameters, from a timing parameter provider coupled to the processor, corresponding to the frequency of the processor clock; and
controlling the duration of each logical output state, using a counter, to adjust for changes in clock frequency based on the variable timing parameters and the request signals so the logical output states of the output signals have a duration corresponding to a number of clock pulses based upon outputs produced by the counter to be operable within the time system of the slave device to manipulate the slave device.

26. The method of claim 25 wherein controlling the duration of each logical output state comprises:
assigning a number of clock pulses to the logical output state based on the timing parameters and request signals; and
allowing the output state to change only after the number of clock pulses has been counted.

27. A method of converting request signals from a processor running on a processor clock to control signals for controlling a slave device having a time system asynchronous with the processor clock, the method comprising:
receiving the request signals from the processor;
determining a logical cycle for the control signals based on the request signals;
presenting the control signals in the logical cycle by causing the control signals to cycle through a plurality of logical states corresponding to the logical cycle;
receiving programmable timing parameters corresponding to the processor clock from a parameter provider coupled to the processor; and
controlling the time at which state changes occur in the control signals throughout the logical cycle, using a counter, to adjust for changes in clock frequency based on the programmable timing parameters and the request signals so that each of the logical states has a duration corresponding to a number of clock pulses based upon outputs produced by the counter such that the logical cycle is within predetermined time limits so the control signals control the slave device.

28. The method of claim 27 wherein controlling the time at which state changes occur in the control signals comprises:
determining a number of clock pulses of the processor clock to be assigned to each logical state in the logical cycle based on the timing parameters;
counting pulses of the processor clock during each logical state in the logical cycle; and
causing a state change only after the number of clock pulses have been counted which are assigned to a present logical output state.

* * * * *